United States Patent [19]
Whitman

[11] Patent Number: 5,143,498
[45] Date of Patent: Sep. 1, 1992

[54] ROOFING FASTENING DEVICE

[76] Inventor: Robert E. Whitman, 2465 Knights Hill, Toledo, Ohio 43614

[21] Appl. No.: 541,827

[22] Filed: Jun. 21, 1990

[51] Int. Cl.⁵ .................... F16B 39/02; F16B 39/30
[52] U.S. Cl. ................................ 411/82; 411/311; 411/412; 411/930
[58] Field of Search ............ 411/82, 258, 69, 412, 411/413, 386, 417, 418, 310, 311, 930

[56] References Cited

U.S. PATENT DOCUMENTS

| | | | |
|---|---|---|---|
| 408,531 | 8/1889 | Rogers | 411/412 |
| 2,096,937 | 10/1937 | McManus | 411/386 |
| 3,942,405 | 3/1976 | Wagner | 411/412 |

FOREIGN PATENT DOCUMENTS

2515950  10/1976  Fed. Rep. of Germany ...... 411/258

OTHER PUBLICATIONS

IBM Technical Disclosure Bulletin to "Self-Locking Screw", vol. 4, No. 9, Feb. 1962.

*Primary Examiner*—Neill R. Wilson
*Attorney, Agent, or Firm*—George R. Royer

[57] ABSTRACT

The invention herein is a roofing fastening device, with an optional liquid sealer to facilitate the process of affixing rectangularly-shaped sheets or rubber roofing material to the upper surface of a roof. Specifically, the invention is a longitudinally disposed fastening member in the general form of a screw or like member which is adapted to be inserted through the upper surface of the rubber roofing sheets and then through the upper surface of the roof structure, serving thereby to anchor the rubber roofing sheets and thence through the upper surfastening device has a longitudinally extending centrally located chamber which is coaxially aligned with the longitudinal central axis of the fastening member, and this chamber has a plurality of laterally disposed openings which extend from the chamber to the outer surface of the fastening member, said chamber being adapted to receive a liquid sealant at an opening in the upper surface and disperse same through such lateral openings. The exterior surface of the screw shaft is formed with screw threads having a dual set of helically-wound threaded members. The external, most radially outer portions of the threads are grooved with seriated teeth to enhance the holding power of the fastening member.

3 Claims, 1 Drawing Sheet

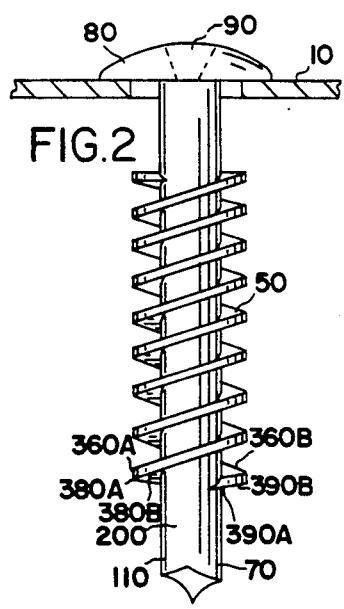
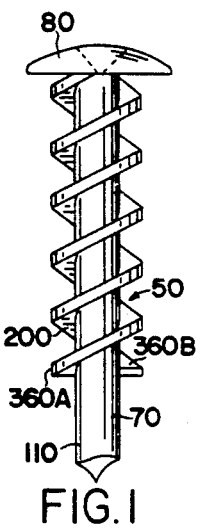
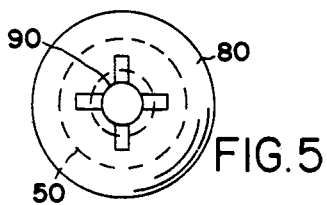
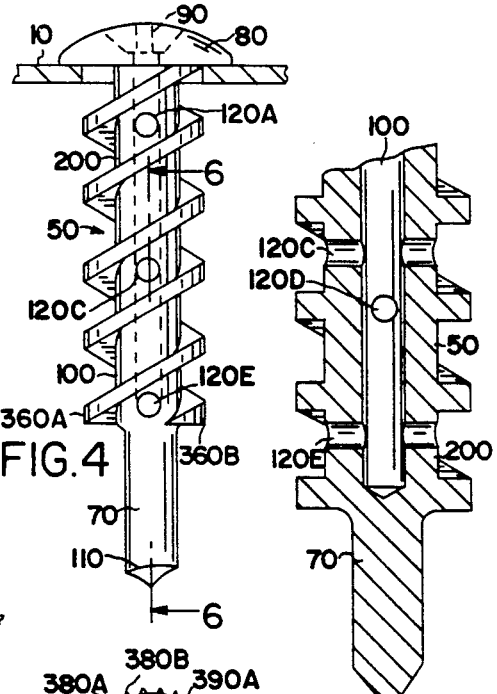
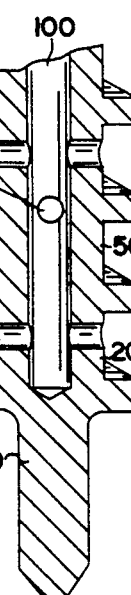
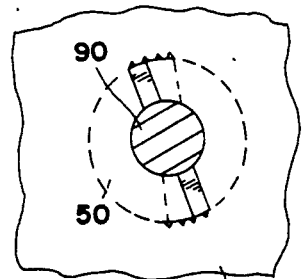
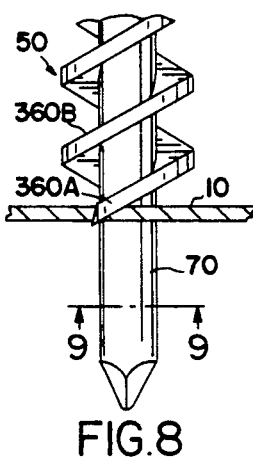
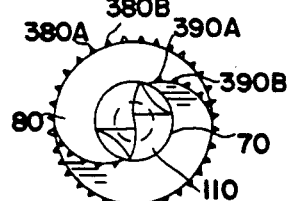
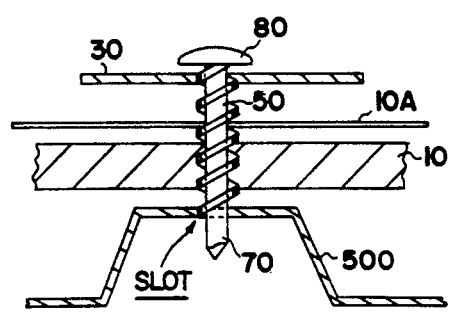
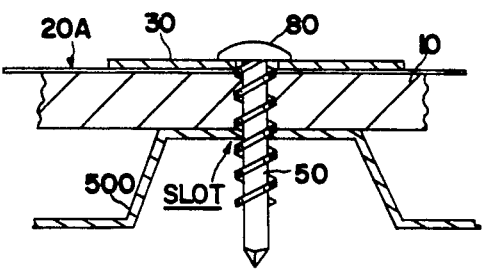

ROOFING FASTENING DEVICE

BACKGROUND OF INVENTION AND DESCRIPTION OF PRIOR ART

The invention herein is a fastening device for aiding in the process of securing sheets of longitudinally extending rubber roofing to the upper surface of a roof. In this regard, roofing sheets made of rubber material are now used more widely for roof coverings because of the durability. However, this invention is also applicable to other types of roof coverings.

The general approach is to place over the upper roof surface a series of rubber roof sheets so that they encompass the entire upper roof surface as a complete covering. In many applications, strategically placed bonding plates are affixed over the top of the rubber roof sheets to secure the rubber roof sheets in a flush manner to the upper roof surface. A usual arrangement in using such fastening plates is a series of evenly-spaced rows and columns of such plates, regularly and symmetrically spaced as seen from an upper elevational view. Bonding plates function to securely hold the rubber roofing sheets in place with the aid of a fastening device such as a longitudinally extending screw-like or nail-like member forcibly thrust downwardly through the horizontally disposed bonding plate into the roof deck or fixed roof structure. Thus, the present practice, as stated, is to disperse the bonding plates over the upper roof surface, using nails or screws, to adhere the bonding plate firmly against the upper surface of the roofing sheets.

In some circumstances, the bonding plates are placed over the top of the roofing sheets, while in other applications the bonding plates are placed under the roofing sheets. In either event, the subject fastening device is used to affix the roof sheets to the roof.

One of the predominant problems encountered with the use of nails or screws in fastening such bonding plates is that when they are inserted into the roof deck, they generally cause distortion damage in the wood or other roof material immediately around the screw or nail. Such distortion damage usually leaves gaps or spaces adjacent the screw or nails. This, in turn, causes weakness in the roof structure and also yields a potential source of roof leaks through the nail openings. This invention is therefore directed to overcome this problem and the following objects are directed accordingly.

OBJECTS

In view of the above, it is an object of the subject invention to provide an improved device for affixing rubber roofing sheets to the upper surface of a roof;

Still another object of the subject invention is to provide an improved fastening device to maximize the holding power of the device;

Yet another object of the subject invention is to provide an improved fastening device for installing rubber roof sheets for covering roof structures;

A further object of the subject invention is to provide an improved sealing and securing apparatus for affixing roofing materials to a roof structure;

Still another object of the subject invention is to provide an improved device for adhering and affixing rubber roof sheets to the upper surface of a roof;

Other and further objects will become apparent from a reading of the following description taken in conjunction with the claims.

DESCRIPTION OF DRAWINGS

FIG. 1 is a side elevational view of the subject device utilizing the invention herein;

FIG. 2 is a side elevational view of the subject invention in cross-sectional configuration shown through the line A—A in FIG. 4;

FIG. 3 is a side elevational view of the device shown through line B—B in FIG. 3;

FIG. 4 is a side elevational view of the subject device, in section, showing the lower portion of the subject device;

FIG. 5 is a top elevational view of the subject device;

FIG. 6 is a side elevational view of the subject device, in cross section configuration;

FIG. 7 is a bottom elevational view of the subject device, in opposition to the top elevational view of FIG. 5;

FIG. 8 is a side elevational view showing lower portion of the subject device;

FIG. 9 is a cross sectional view from a bottom elevational perspective, viewed at line 9—9 in FIG. 8, demonstrating the penetration through a roof deck;

FIG. 10 is a side elevational view of the subject device showing the initial penetration of the subject fastening device through the multiple roof deck, roofing, and subroof structures;

FIG. 11 is a side elevational view of the subject device, in the final affixation stage, where the subject device is affixed permanently and fully into the roof deck, roof covering, and roof substructure.

DESCRIPTION OF GENERAL EMBODIMENT

The invention herein is a roofing fastening device, with an optional liquid sealer to facilitate the process of affixing rectangularly-shaped sheets or rubber roofing material to the upper surface of a roof. Specifically, the invention is a longitudinally disposed fastening member in the general form of a screw or like member which is adapted to be inserted through the upper surface of the rubber roofing sheets and thence through the upper surface of the roof structure, serving thereby to anchor the rubber roofing sheets to the fixed roof structure. The fastening device has longitudinally extending centrally located chamber which is coaxially aligned with the longitudinal central axis of the fastening member, and this chamber has a plurality of laterally disposed openings which extend from the chamber to the outer surface of the fastening member, said chamber being adapted to receive a liquid sealant at an opening in the upper surface and disperse same through such lateral openings. The exterior surface of the screw shaft is formed with screw threads having a dual set of helically-wound threaded members. The external, most radially outer portions of the threads are grooved with seriated teeth to enhance the holding power of the fastening member.

DESCRIPTION OF PREFERRED EMBODIMENT

The subject invention centers on a device used for affixing rubber roof sheets to the upper surface of a roof of any type of building structure. Moreover, the preferred embodiment of the subject invention is most applicable to roof structures wherein the roof is horizontal, although it is not to be so limited. While the description below is explicitly directed to an application wherein the fastening or bonding plates are affixed over top of the rubber roof sheets, it will be understood that this invention is equally applicable to those circumstances wherein the bonding plates are affixed between the upper roof surface and the lower surface of the rubber roofing sheets. Moreover, description and application of the preferred embodiment is not to be considered as limiting the scope of the subject invention.

Turning now to the drawing, the subject invention involves a device and method to aid in the affixing of rubber roof sheets to a roof surface such as roof 10 shown in FIG. 4. In this respect, the roof 10 is shown as a horizontal, flat roof having perimeter edges not shown. Such roof 10 is considered conventional in this regard, however, the subject invention can apply to a roof of any external configuration, whether rectangular, flat, or other structural shape.

In the procedure of affixing rubber roof sheets to roof 10, the first step in the process is to lay, in a flush manner, a plurality of rectangular shaped rubber roof sheets, such as sheet 20A, shown in FIG. 11, to the upper surface of the roof 10. The rubber sheet 20A is affixed over the upper surface of the roof along with the other rubber sheets so that all such sheets cover the entire roof surface in a flush manner. Next, it is the usual practice to use a bonding plate such as bonding plate 30, which is affixed over the upper surface of the rubber roof sheet 20A, as shown in FIG. 4 once the rubber roof sheet is laid in the manner described above. Such bonding plates are generally affixed in a series of evenly-spaced rows and colums, in a similar grid pattern over the upper roof surface, although this feature is not critical to the subject invention. The subsequent step is to nail, screw, spike or affix by a suitable fastening member the rubber roofing sheet 20A to the roof 10. In some situations, as discussed above, a horizontal bonding plate, not shown in the embodiments represented in the drawings, is used as an intermediate securing member with the fastening device inserted through a vertical opening in such bonding plate. In the embodiment shown in the drawings and described herein, no such intermediate bonding plate is used.

Certain applications are better suited for screws as opposed to nails as such fastening devices on other means as the fastening device to secure the rubber roof to the roof. In this latter regard, irrespective of whether the fastening member is a nail, spike, screw, or other similar longitudinally extending member, it extends vertically downwardly through the rubber roof sheet.

In describing the preferred embodiment of the subject invention, it is to be stressed at this point that the description herein will be directed to a screw-like fastening device 50, shown in FIGS. 1 and 4. However, it is to be noted that the features of the subject invention are equally applicable to other screw-like fastening devices irrespective of the type of helical pattern utilized on the external surface of the helical pattern.

As seen in FIGS. 1 and 4, the roof fastening device 50 has a vertical shank 70 extending vertically downwardly from a round, enlarged head 80. As can be seen, the round head 80 is larger than the cylindrical shank 70 for the reason that it is desirable to prevent water leakage around the head. It is also to be indicated that the shape of the head may be other than round, so long as it is sufficiently structured to prevent water leakage.

In the upper surface of the head 80 is an opening 90, which opening extends vertically downwardly from the upper surface of the head 80 communicating and extending directly to a central vertical chamber 100 that extends downwardly through the center of the shank 70, as shown. The vertical chamber 100 is a longitudinally extending member that is co-axially aligned with the longitudinal central axis of the shank 70. As such, the longitudinal chamber 100 is within the shank 70 portion, and such chamber 100 ends just short of the bottom 110 of the shank 70.

Further, as seen in the drawings, the vertical internal chamber 100 has a plurality of lateral openings 120A, 120B . . . 120M that communicate directly from the inside of the chamber 100 to the outside circumferential surface 200 of the shank 70 so that any fluid injected into the internal chamber 100 can be expelled through the lateral openings 120A, 120B . . . 120E to areas just immediately outside the shank 70 for more effective sealing of the shank into any wood deck. It is to be noted, however, that the constructional arrangement of the central chamber with such vented openings, as discussed, is only an optional or alternate embodiment of the subject invention, and that the use of a shank 70 without such an internal chamber 100 is the main or preferred embodiment of the subject invention, and it is therefore to be made clear that irrespective of the use of an internal chamber 100 or solid shank 70, the inventive concepts herein remain the same nonetheless.

Referring now to the external circumferential surface 200 of the shank 70, as can be seen in the drawings, the external surface 200 has integrally formed thereon a radially outwardly projecting threaded member 300 helically wound and formed around the external surface of the shank in a conventional helical pattern.

More specifically as shown in the drawings, the exterior threaded member 300 is comprised of two separate sub-helical members 360A and 360B, thereby providing a double helical arrangement around the exterior surface 300 of the shank 70. The separate sub-helical members 360A and 360B are each wound in a helical manner, independently of one another, around such exterior surface so as to provide the double helical arrangement, as seen. Each of the sub-helical members 360A and 360B have an external edge 370A and 370B respectively, and each such external edge is serrated with teeth members. More specifically, sub-helical member 360A has on its radially externally disposed edge a plurality of serrations 380A and 380B . . . which serrations form corresponding teeth members by each such serration. In similar fashion, sub-helical threaded member 360B has a plurality of serrations thereon to form similarly corresponding teeth members 390A, 390B therein. As seen, such respective teeth members in both threaded members 360A and 360B extend, in the preferred embodiment, completely along the total depth of the respective threaded member. It is not essential in the subject invention that the teeth members, as described, extend over the entire length of the threaded member.

Furthermore, it is not critical to the subject invention that there be a double helical member for the threaded members 200, nor is it critical that the serrations or teeth on such helical member extend over the entire threaded couples.

When the subject device is inserted into a roof structure such as roof 10, the threaded members caused by the rotary force yielded in the downwardly thrusted turning movement, creates a cut slot in the wood that permits easier penetration and ultimately a firmer hold by the screw member. In some embodiments a bottom interior ceiling clip 500 is adapted to also receive the shank of the screw.

In summary, the subject invention is a longtudinally extending fastening member adapted to penetrate a roof structure for purposes of securing roof covering to such roof structure, such device comprising a longitudinally extending shank member, such shank member having a a circumferential surface, and such shank having a head thereon and a bottom portion, with such circumference having a double helical threaded member therein.

Yet another summary of the subject invention includes a roof fastening device for fastening rubber roof sheets to the upper surface of a roof deck comprising a longitudinally extending shank member having a given diameter, such shank member being of general cylindrical configuration, such shank member having an upper end and a lower end, and further having an outer circumferential surface, and a head member integrally and concentrically affixed to the upper end of such cylindrical shaft member, such head member having a diameter larger than the shaft diameter of the shaft member, and including double helix threaded members formed on the outer circumferential surface of such shank member.

I claim:

1. A longitudinally extending fastening member adapted to penetrate a roof structure for purposes of securing roof covering to such roof structure, such device comprising:
   (a) a longitudinally extending shank member, such shank member having a circumferential surface, and said shank having a head thereon and a bottom portion, with said circumference having a double helical threaded member therein, with such threaded members having serrations on the external edge surfaces thereof;
   (b) chamber means with an internal spatial area, in said fastening device to receive a liquid sealer, said chamber means having an opening, to spatial areas outside fastening device in said outer circumferential surface of said shank member and said head member, and said chamber member communicating with said openings on said outer circumference of said shank member whereby there is spatial continuity between the internal spatial area of said chamber means and said openings.

2. A roof fastening device for fastening rubber roof sheets to the upper surface of a roof deck comprising:
   (a) a longitudinally extending shank member having a given diameter, said shank member being of general cylindrical configuration, said shank member having an upper end and a lower end, and further having an outer circumferential surface, said shank member having a plurality of lateral openings in the circumferential surface;
   (b) a head member integrally and concentrically affixed to the upper end of said cylindrical shaft member, said head member having a diameter larger than the shaft diameter of the shaft member;
   (c) double helix threaded members formed on the outer circumferential surface of said shank member, with the external threaded members having serrated portions on the external edge surface thereof;
   (d) chamber means with an internal spatial area, in said fastening device to receive a liquid sealer, said chamber means having an opening, to spatial areas outside fastening device in said outer circumferential surface of said shank member in said head member, and said chamber member communicating with said openings on said outer circumference of said shank member whereby there is spatial continuity between the internal spatial area of said chamber means and said lateral openings.

3. A roof fastening device for fastening rubber roof sheets to the upper surface of a roof deck comprising:
   (a) a longitudinally extending shank member having a given diameters, said shank member being of general cylindrical configuration, said shank member having an upper end and a lower end, and further having an outer circumferential surface with said shank member having a plurality of lateral openings on said circumferential surface, said openings communicating with spatial areas outside said shank member;
   (b) a head member integrally and concentrically affixed to the upper end of said cylindrical shaft member, said head member having a diameter larger than the shaft diameter of the shaft member;
   (c) double helix threaded members formed on the outer circumferential surface of said shank member, wherein said threaded members have serrations on the external edge surfaces thereof;
   (d) chamber means with an internal spatial area disposed in the shank member of said fastening device to receive a liquid sealer, said chamber means having an opening to spatial areas outside fastening device of said shank member with said opening being located in said head member, said chamber member communicating with said lateral openings on said outer circumference of said shank member whereby there is spatial continuity between the internal spatial area of said chamber means and said lateral openings.

* * * * *